United States Patent [19]
Ichise

[11] Patent Number: 5,478,605
[45] Date of Patent: Dec. 26, 1995

[54] METHOD OF PRODUCING RUBBER WIPER BLADES

[75] Inventor: Yoshiju Ichise, Ageo, Japan

[73] Assignee: Fukoku Co., Ltd., Saitama, Japan

[21] Appl. No.: 358,567

[22] Filed: Dec. 13, 1994

Related U.S. Application Data

[63] Continuation of Ser. No. 162,942, Dec. 8, 1993, abandoned.

[51] Int. Cl.$^6$ .................................................. B05D 1/02
[52] U.S. Cl. ........................... 427/421; 427/424; 264/146; 29/897.2
[58] Field of Search ................................... 427/421, 424; 264/146; 29/897.2; 15/250.32, 250.41, 250.36, 250.42

[56] References Cited

U.S. PATENT DOCUMENTS

| | | | |
|---|---|---|---|
| 3,035,297 | 4/1960 | Gorman et al. | 15/250.36 |
| 4,103,385 | 8/1978 | Porter | 15/250.36 |
| 4,852,204 | 8/1989 | Wilson | 15/250.07 |
| 4,904,434 | 2/1990 | Hyer | 264/146 |
| 4,981,637 | 1/1991 | Hyer | 264/146 |

FOREIGN PATENT DOCUMENTS 0516470  5/1992  European Pat. Off. .

Primary Examiner—Shrive Beck
Assistant Examiner—David M. Maiorana
Attorney, Agent, or Firm—Townsend & Banta

[57] ABSTRACT

Two rubber wiper blades are united with each other at lip portions so as to form a tandem rubber wiper blade, and notches are provided on both sides of a common lip portion at the center portion thereof. By providing the notches, a joint portion of the two rubber wiper blades is formed, which enables the tandem rubber wiper blade to be easily torn.

2 Claims, 4 Drawing Sheets

METHOD OF PRODUCING RUBBER WIPER BLADES

This application is a file wrapper continuation of application Ser. No. 08/162,942, filed Dec. 8, 1993 now abandoned.

BACKGROUND OF THE INVENTION

1. Field of the Invention

The present invention relates to a method of producing a rubber wiper blade having excellent wiping ability, durability and productivity, and a rubber wipe blade produced by this method.

2. Description of the Related Art

A rubber wiper blade is generally swept across the glass surface of a vehicle to wipe off raindrops or the like on the windshield. Therefore, rubber wiper blades having low frictional resistance and improved abrasion resistance are desired.

Since a rubber wiper blade is disposed on the outside of a vehicle, it is also necessary that it have resistance to the ozone and weather.

FIG. 6 is a perspective view of a conventional rubber wiper blade. In FIG. 6, the reference numeral 1 represents a rubber wiper blade, and reference numeral 2 is a base end portion which engages a holding fixture (not shown). The reference numeral 3 represents a neck portion; reference numeral 4 is a rocking portion; reference numeral 5 is a lip portion, and reference number 5a is the edge thereof.

Rubber wiper blade 1 is a molded product in which natural rubber or synthetic rubber is used. For a rubber wiper blade having natural rubber as the base material, the frictional resistance is lowered and the abrasion resistance is improved by subjecting the surface of the rubber blade to a chlorination treatment or a fluorination treatment, or by forming a coating layer 6 on the surface, as shown in FIG. 8.

In a rubber wiper blade containing synthetic rubber, such as ethylene propylene rubber (EPDM) as the base material, although the weathering resistance is excellent, the effect of a chlorination treatment on the reduction of the frictional resistance cannot be expected, it is subjected to a fluorination treatment so as to lower the frictional resistance and improve the abrasive resistance.

In order to enhance the productivity of a rubber wiper blade, what is referred to as a tandem rubber wiper blade, such as that shown in FIG. 9, has been proposed. The tandem rubber blade 7 shown in FIG. 9 is composed of two rubber wiper blades 1 united with each other at the lip portions 5. The surface of a common lip portion 8 of the tandem rubber wiper blade 7 is subjected to a coating treatment such as described above so as to provide a coating film.

The common lip portion 8 of the tandem rubber wiper blade 7 which is subjected to the coating treatment, is mounted on a bearer 9, and the tandem rubber wiper blade 7 is separated into two rubber wiper blades 1 by pressing a long knife blade 10 against the center portion of the common lip portion 8, as shown in FIG. 10. Such a treatment is referred to as a "before-cutting-coating treatment".

In contrast, in what is referred to as an "after-cutting-coating treatment", the common lip portion 8 of the tandem rubber wiper blade 7, which has not been subjected to a coating treatment, is mounted on the bearer 9, and the tandem rubber wiper blade 7 is separated into two rubber wiper blades 1 by pressing the long knife blade 10 against the center portion of the common lip portion 8. After the cutting step, the surface of the lip portion 5 of each rubber wiper blade 1 is subjected to a coating treatment; that is, for example, a coating material is sprayed onto the surface.

There are, however, some problems with the conventional rubber wiper blades, and with the conventional method of producing a rubber wiper blade. In particular, in the before-cutting-coating treatment, since the coating film 6 is hard, it is impossible to cut the common lip portion 8 with the knife blade 10 at a high speed and the edge of the knife 10 is abraded at the cutting step.

On the other hand, in the after-cutting-coating treatment, since the coating film 6 is also formed on the end portion of the lip portion 5, as shown in FIG. 8, the wiping ability of the rubber wiper blade 1 is deteriorated.

SUMMARY OF THE INVENTION

Accordingly, it is an object of the present invention to eliminate the above-described problems in the related art and to provide a method of producing a rubber wiper blade which does not abrade the edge of a knife blade, and which is capable of maintaining good wiping ability even after forming a coating film, and a rubber wiper blade produced by this method.

To achieve this objective, in one aspect of the present invention, there is provided a method of producing a rubber wiper blade comprising the steps of: providing notches on both sides of a common lip portion of a tandem rubber wiper blade which is composed of two rubber wiper blades united with each other at lip portions; and applying a coating material to the common lip portion.

In another aspect of the present invention, there is provide a rubber wiper blade comprising two rubber wiper blades which are united with each other at lip portions so as to form a tandem rubber wiper blade, wherein notches are provided on both sides of a common lip portion of the two rubber wiper blades.

According to the rubber wiper blade of the present invention, since two rubber wiper blades are united with each other at the thin joint portion of the lip portions, it is easy to tear the common lip portion. In addition, it is possible to prevent the edges of the lip portions from being broken or deformed during production or transportation.

According to a method of producing a rubber wiper blade of the present invention, since notches are provided on both sides of a common lip portion, and thereafter a coating material is applied to the common lip portion, there is no fear of damaging the edge of a knife blade and it is possible to maintain good wiping ability.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 1:
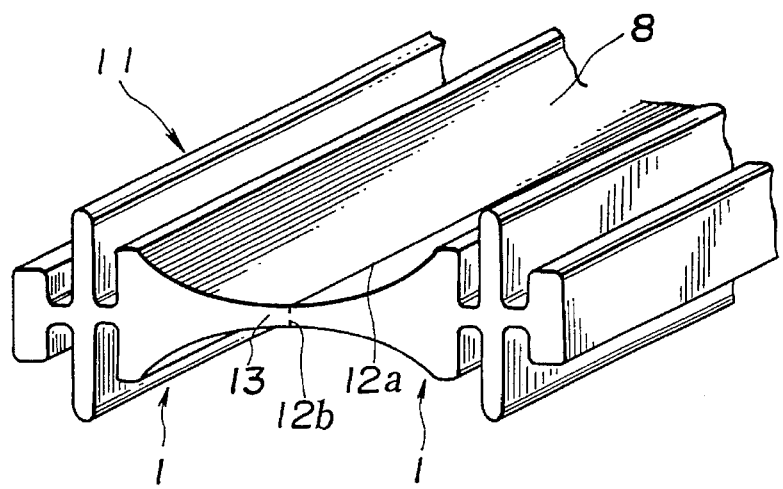
FIG. 1 is a perspective view of an embodiment of a rubber wiper blade according to the present invention.
Figure 2:
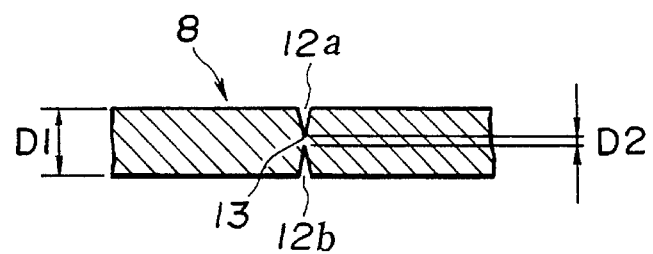
FIG. 2 is a detailed sectional view of tile common lip portion of the rubber wiper blade shown in FIG. 1.

FIG. 1 is a perspective view of all embodiment of a rubber wiper blade according to the present invention. In FIG. 1, the reference numeral 11 represents a tandem rubber wiper blade, and 12a and 12b notches provided on both sides of a common lip portion 8 of the tandem rubber wiper blade 11. FIG. 2 shows the enlarged notches. As shown in FIG. 2, if it is assumed that the thickness D1 of the common lip portion 8 is, for example, 0.6 to 1.0 mm, the thickness D2 of the joint portion 13 formed at the center portion of the common lip portion 8 by the notches 12a and 12b is, for example, 0.005 mm.

Figure 5:
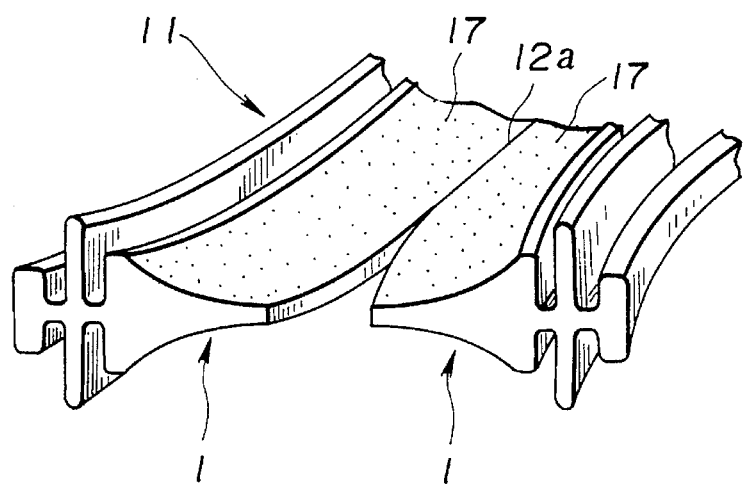
FIG. 5 is a schematic perspective view of the rubber wiper blade shown in FIGS. 1 and 3, explaining the step of separating the two rubber wiper blades.
Figure 6:
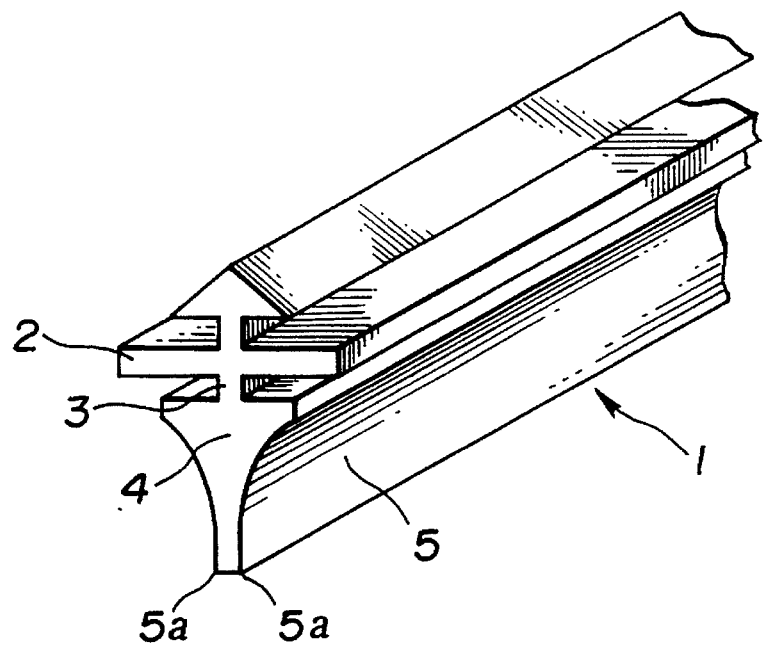
FIG. 6 is a perspective view of a conventional rubber wiper blade.
Figure 7:
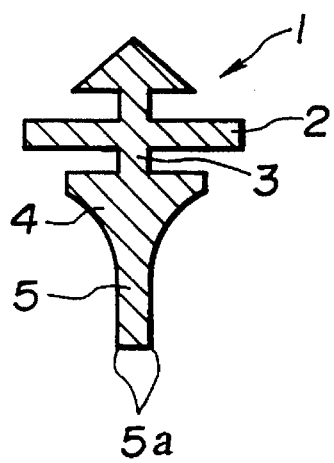
FIG. 7 is a sectional elevational view of the conventional rubber wiper blade shown in FIG. 6.
Figure 8:
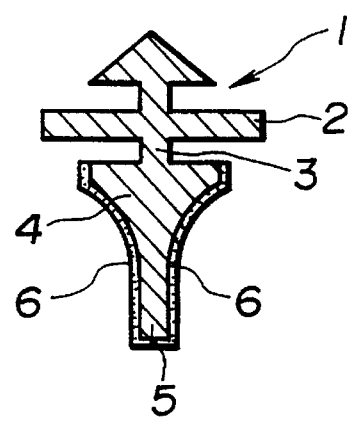
FIG. 8 is a sectional view of a conventional rubber wiper blade with a coating material applied thereto.
Figure 9:
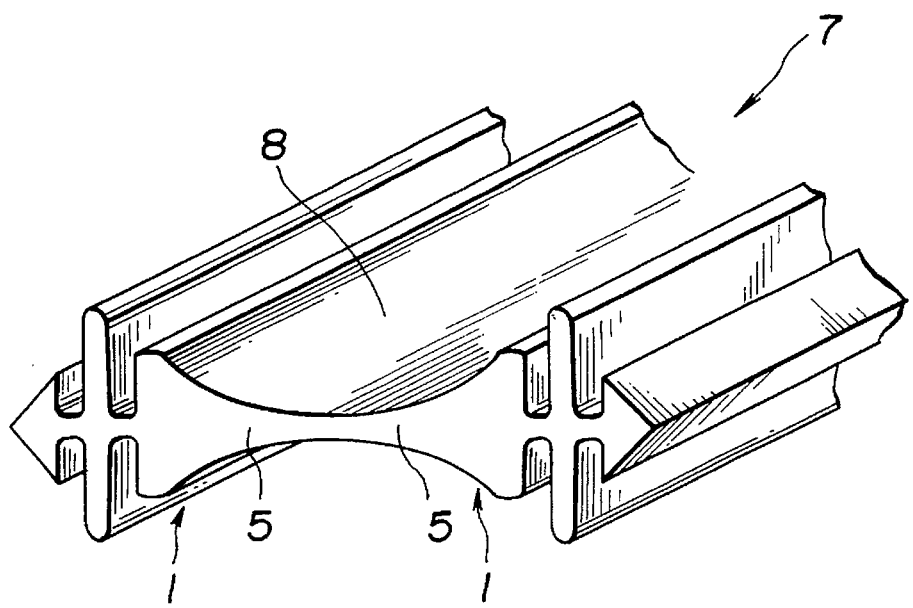
FIG. 9 is a schematic perspective view of a conventional tandem rubber wiper blade.
Figure 10:
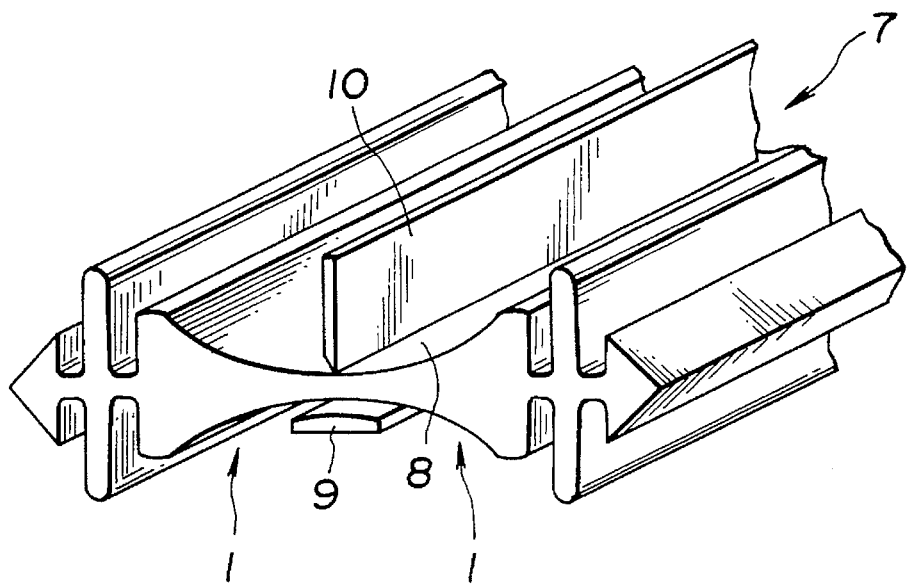
FIG. 10 is a schematic perspective view of a conventional method of producing a rubber wiper blade.

Since the thickness D2 of the joint portion 13 at the center portion of the tandem rubber wiper blade 11 which is provided with the notches 12a and 12b on both sides of the common lip portion 8 is too thin, for example, 0.005 mm, it is easy to tear the tandem rubber wiper blade 11 with the hands into two rubber wiper blades 1, as shown in FIG. 5.

in addition, since no special jig is necessary, it is possible to tear the tandem rubber wiper blade 11 by a shop or by a customer. Furthermore, it is possible to prevent the edges 5a of the lip portions 5 of the rubber wiper blades 1 (see FIG. 1 ) from being broken or deformed during transportation. Since the two rubber wiper blades 1 are united at the joint portion 13, the tandem rubber wiper blade 11 is resistant to torsion, and facilitates the application of a coating material and handling, such as packing.

Figure 3:
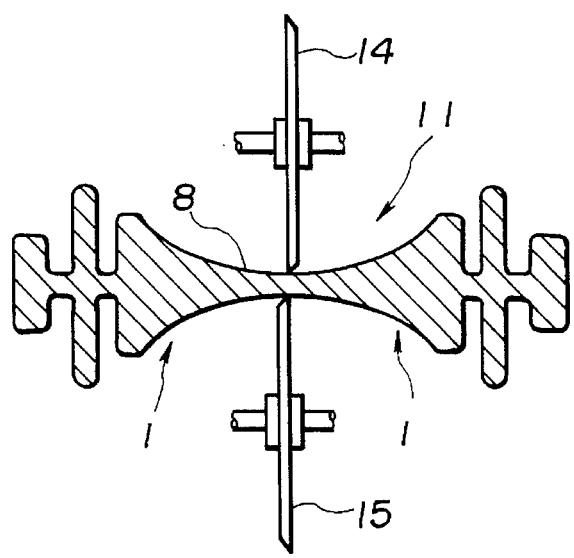
FIG. 3 is a sectional side elevational view of an embodiment of a method of producing a rubber wiper blade according to the present invention.

FIG. 3 is a sectional side elevational view of an embodiment of a method of producing a rubber wiper blade according to the present invention. In FIG. 3, the reference numeral 14 represents an upward rotary knife and 15 a downward rotary knife. The tandem rubber wiper blade 11 is fixed by guide brackets (not shown).

Figure 4:
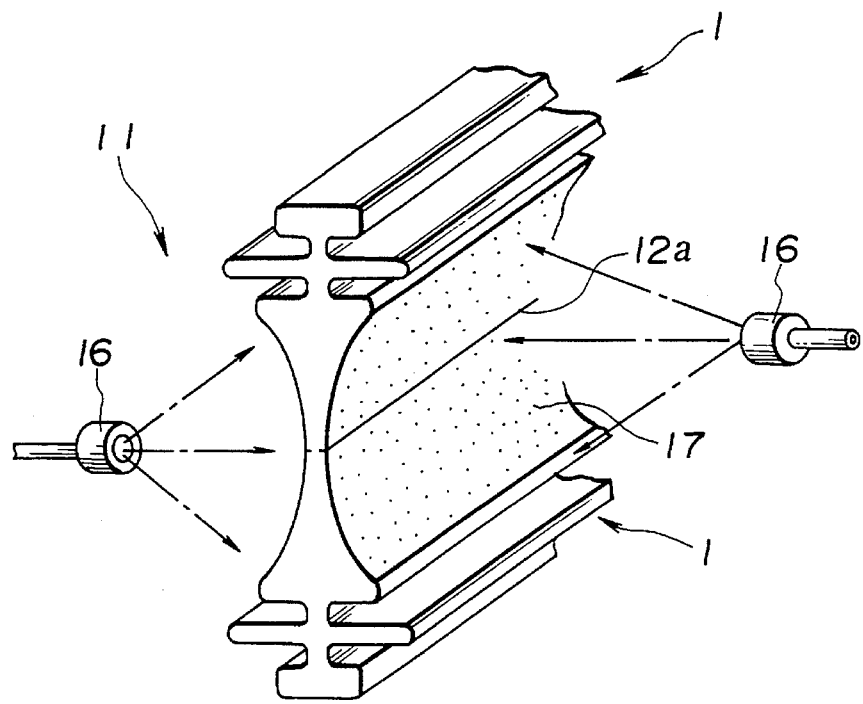
FIG. 4 is a schematic perspective view of the embodiment shown in FIG. 3, explaining the step of applying a coating material to the common lip portion.

By the upward rotary knife 14 and the downward rotary knife 15, the notches 12a and 12b are formed on both sides of the common lip portion 8, as described above. A coating material 17 is then applied by coating equipment 16 to both sides of the common lip portion 8 of the tandem rubber wiper blade 11 provided with notches 12a, 12b, as shown in FIG. 4. At this time, since the coating material 17 does not enter the notches 12a and 12b, the edges 5a of the lip portions 5 of the rubber wiper blades 1 are not coated with the coating material 17.

As for the coating material 17, nylon, graphite, molybdenum, and teflon (polytetrafluoroethylene) are usable. After the coating step, it is easy to tear the tandem rubber wiper blade 11 by a separating mechanism (not shown) or with the hands into the two rubber wiper blades 1, as shown in FIG. 5.

As explained above in detail, according to the rubber wiper blade of the present invention, since a tandem rubber wiper blade is composed of two rubber wiper blades united at the thin joint portion of the common lip portion, it is easy to tear the tandem rubber wiper blade with the hands. In addition, since no special jig is necessary, it is possible to tear the tandem rubber wiper blade 11 at a shop or by a customer. Furthermore, it is possible to prevent the edges of the lip portions of the rubber wiper blades from being broken or deformed during transportation. Handling of the tandem rubber wiper blade, such as packing, is also facilitated.

According to a method of producing a rubber wiper blade of the present invention, since the common lip portions of the tandem rubber wiper blades is provided with notches by an upward rotary knife and a downward rotary knife at the first step, the edges of the rotary knives do not come into contact with each other. It is, therefore, possible to prevent the edges of the rotary knives from being abraded. Since a coating material is applied to the surfaces of the common lip portion at the second stage, there is no tear of the edges of the knife blades being abraded by the coating material. In addition, the coating material does not adhere to the edges of the lip portions, and good wiping ability is maintained.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A method of producing a coated rubber wiper blade comprising the steps of: providing notches with rotary knifes on both sides of a common lip portion of tandem rubber wiper blade which is composed of two rubber wiper blades united with each other at lip portions, applying a coating material selected from the group consisting of graphite, molybdenum, nylon and polytetrafluoroethylene to both sides of said common lip portion, and tearing the common lip portion of the tandem rubber wiper blades at said notches, so as to form two rubber wiper blades each of which has an uncoated edge surface.

2. A method of producing a coated rubber wiper blade according to claim 1, wherein said notches are formed by cutting side surfaces of said common lip by an upward rotary knife and a downward rotary knife.

\* \* \* \* \*